W. D. DOREMUS.
LINE FASTENERS.
No. 179,773. Patented July 11, 1876.
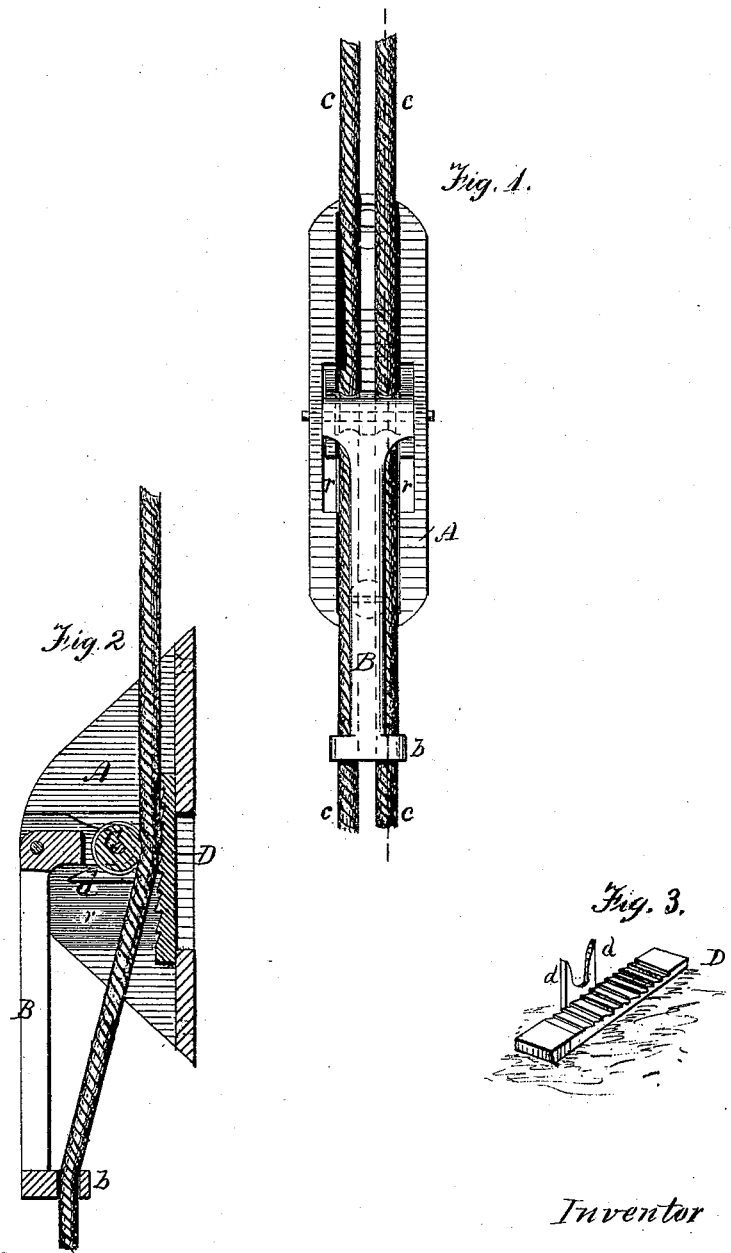
Witnesses
Inventor
Willard D. Doremus.

UNITED STATES PATENT OFFICE.

WILLARD D. DOREMUS, OF VARRICK, NEW YORK.

IMPROVEMENT IN LINE-FASTENERS.

Specification forming part of Letters Patent No. 179,773, dated July 11, 1876; application filed June 15, 1876.

*To all whom it may concern:*

Be it known that I, WILLARD D. DOREMUS, of Varrick, in the county of Seneca and State of New York, have invented a new and Improved Device for Holding the Cords of Awnings, Sheets of Sailing-Vessels, &c.; and I do hereby declare the following to be a full, clear, and exact description of the same, reference being had to the accompanying drawing, forming part of this specification, in which—

Figure 1 represents a top-plan view of my invention; Fig. 2, a longitudinal central section of the same, and Fig. 3 a detached view of the serrated bed plate or block.

Similar letters of reference in the accompanying drawings denote the same parts.

Heretofore the construction of devices of this class has been such that the cords operated upon were allowed to run over abrading surfaces, which had a tendency to rapidly wear them out; and, further, their action on the cords, when bringing them to a stop, was so sudden that there was liability of the cords being snapped and broken.

My invention has for its object to obviate these difficulties; and to that end it consists in certain devices and mechanical combinations, hereinafter more fully described, whereby the cords are made to run always over smooth and rolling surfaces, and the stoppage of them accomplished gradually and without shock.

Referring to the drawings, A represents a bracket, made preferably of cast metal, of convenient size, and adapted to be secured to a post, wall, or other suitable support. B is an arm or lever, pivoted in the side pieces of the bracket, its inner end being bifurcated and carrying a grooved roller, C. The outer end of the lever is provided with a right-angular projection, b, which is perforated for the passage of the cords c c. D is a bed plate or block, located beneath the roller C, and between which and the roller the cords are adapted to be clamped and held when desired. Said bed-plate is provided with lugs d d, preferably one on each side, which project into recesses r r in the side pieces of the bracket, and it is made wedge-shaped, and its upper surface is serrated to better hold the cord.

The inner end of the lever B, carrying the roller, fits into the slotted lugs of the bed-plate, and when the lever is vibrated the bed-plate is slid backward and forward, as will be readily understood.

The cords are passed down over the grooved roller, between the latter and the bed-plate, and thence through the perforations in the projection on the end of the lever B. By grooving the roller the cords are held apart, and are prevented from becoming entangled and twisted with each other.

When the outer end of the lever is depressed the serrated bed-plate is moved forward, and the roller carrying the cords is made to approach the bed-plate and securely clamp the cords. By giving the bed-plate a sliding motion in the direction of the strain on the cords it will be seen that the latter are prevented from being injured by running over a fixed serrated surface, and from being broken by a too sudden stoppage.

When it is desired to slacken the cords they are grasped by the operator below the lever B, and the latter is raised, this movement drawing back the sliding block, raising the roller therefrom, and allowing the cords to run off over the roller.

My invention is capable of a variety of uses, but is especially adapted as a device for holding the cords of awnings.

It can be manufactured very cheaply, and is not liable to get out of order.

I claim as my invention—

1. The lever B, pivoted as described, and carrying one or more rollers, C, in combination with a sliding bed-plate, for the purpose specified.

2. The bed-plate D, made wedge-shaped in longitudinal section, in combination with lever B and roller C, substantially as described, for the purpose specified.

3. The lever B, having the perforated projection b at its outer end for the passage of the cords, and so arranged that the operator, by grasping the cords and pulling them to one side, can raise the lever, and thus release the cords from the clamping parts, substantially as described.

4. The roller C, located in the inner end of the lever B, and having grooves for guiding and separating the cords, and preventing their becoming entangled with each other, in combination with the roughened plate D, substantially as described.

5. The bed-plate D, provided with the slotted lugs $d\,d$, in combination with the bracket A and the lever B, carrying the roller C, substantially as described.

WILLARD D. DOREMUS.

Witnesses:
   THEO. MUNGEN,
   H. A. DANIELS.